United States Patent
Ramesh et al.

(10) Patent No.: US 11,481,317 B2
(45) Date of Patent: Oct. 25, 2022

(54) EXTENDED MEMORY ARCHITECTURE

(71) Applicant: Micron Technology, Inc., Boise, ID (US)

(72) Inventors: Vijay S. Ramesh, Boise, ID (US); Allan Porterfield, Durham, NC (US); Richard D. Maes, Liberty Lake, WA (US)

(73) Assignee: Micron Technology, Inc., Boise, ID (US)

( * ) Notice: Subject to any disclaimer, the term of this patent is extended or adjusted under 35 U.S.C. 154(b) by 120 days.

(21) Appl. No.: 16/913,304

(22) Filed: Jun. 26, 2020

(65) Prior Publication Data

US 2021/0406166 A1 Dec. 30, 2021

(51) Int. Cl.
*G06F 12/02* (2006.01)
*G06F 12/0868* (2016.01)
*G06F 13/16* (2006.01)
*G06F 11/10* (2006.01)
*G06F 9/38* (2018.01)
*G06F 7/57* (2006.01)
*G06F 13/42* (2006.01)

(52) U.S. Cl.
CPC ............ *G06F 12/0246* (2013.01); *G06F 7/57* (2013.01); *G06F 9/3855* (2013.01); *G06F 11/1068* (2013.01); *G06F 12/0868* (2013.01); *G06F 13/1668* (2013.01); *G06F 13/4221* (2013.01)

(58) Field of Classification Search
CPC ...... G06F 7/57; G06F 9/3855; G06F 11/1068; G06F 12/0246; G06F 12/0868; G06F 13/1668; G06F 13/4221
See application file for complete search history.

(56) References Cited

U.S. PATENT DOCUMENTS

| 8,438,455 | B2 | 5/2013 | Vogan et al. |
| 9,449,035 | B2 | 9/2016 | Grossman et al. |
| 9,477,295 | B2 | 10/2016 | Jreji et al. |
| 9,484,103 | B1 | 11/2016 | Bruce et al. |
| 2010/0017649 | A1 | 1/2010 | Wu et al. |
| 2015/0371684 | A1 | 12/2015 | Mataya |
| 2018/0095750 | A1* | 4/2018 | Drysdale .................. G06F 9/50 |
| 2018/0196668 | A1* | 7/2018 | Lee ..................... G06F 9/30029 |
| 2018/0293174 | A1* | 10/2018 | Song .................. G06F 12/1009 |

(Continued)

*Primary Examiner* — Eric T Oberly
(74) *Attorney, Agent, or Firm* — Brooks, Cameron & Huebsch, PLLC

(57) ABSTRACT

Systems, apparatuses, and methods related to extended memory communication subsystems for performing extended memory operations are described. An example apparatus can include a plurality of computing devices. Each of the computing devices can include a processing unit configured to perform an operation on a block of data, and a memory array configured as a cache for each respective processing unit. The example apparatus can further include a first communication subsystem coupled to a host and to each of the plurality of communication subsystems. The example apparatus can further include a plurality of second communication subsystems coupled to each of the plurality of computing devices. Each of the plurality of computing devices can be configured to receive a request from the host, send a command to execute at least a portion of the operation, and receive a result of performing the operation from the at least one hardware accelerator.

26 Claims, 5 Drawing Sheets

(56) References Cited

U.S. PATENT DOCUMENTS

2018/0336034 A1* 11/2018 Warner ................. G06F 9/3814
2019/0096813 A1*  3/2019 Lesea ..................... G06F 13/40
2019/0163364 A1*  5/2019 Gibb ...................... G06F 3/0629
2019/0243571 A1*  8/2019 Narayanan ............ G06F 3/0646
2019/0306055 A1* 10/2019 Jiang ..................... H04L 45/566

* cited by examiner

EXTENDED MEMORY ARCHITECTURE

TECHNICAL FIELD

The present disclosure relates generally to semiconductor memory and methods, and more particularly, to apparatuses, systems, and methods for an extended memory architecture.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, and resistance variable memory such as phase change random access memory (PCRAM), resistive random access memory (RRAM), and magnetoresistive random access memory (MRAM), such as spin torque transfer random access memory (STT RAM), among others.

Memory devices may be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system.

DETAILED DESCRIPTION

Figure 1:
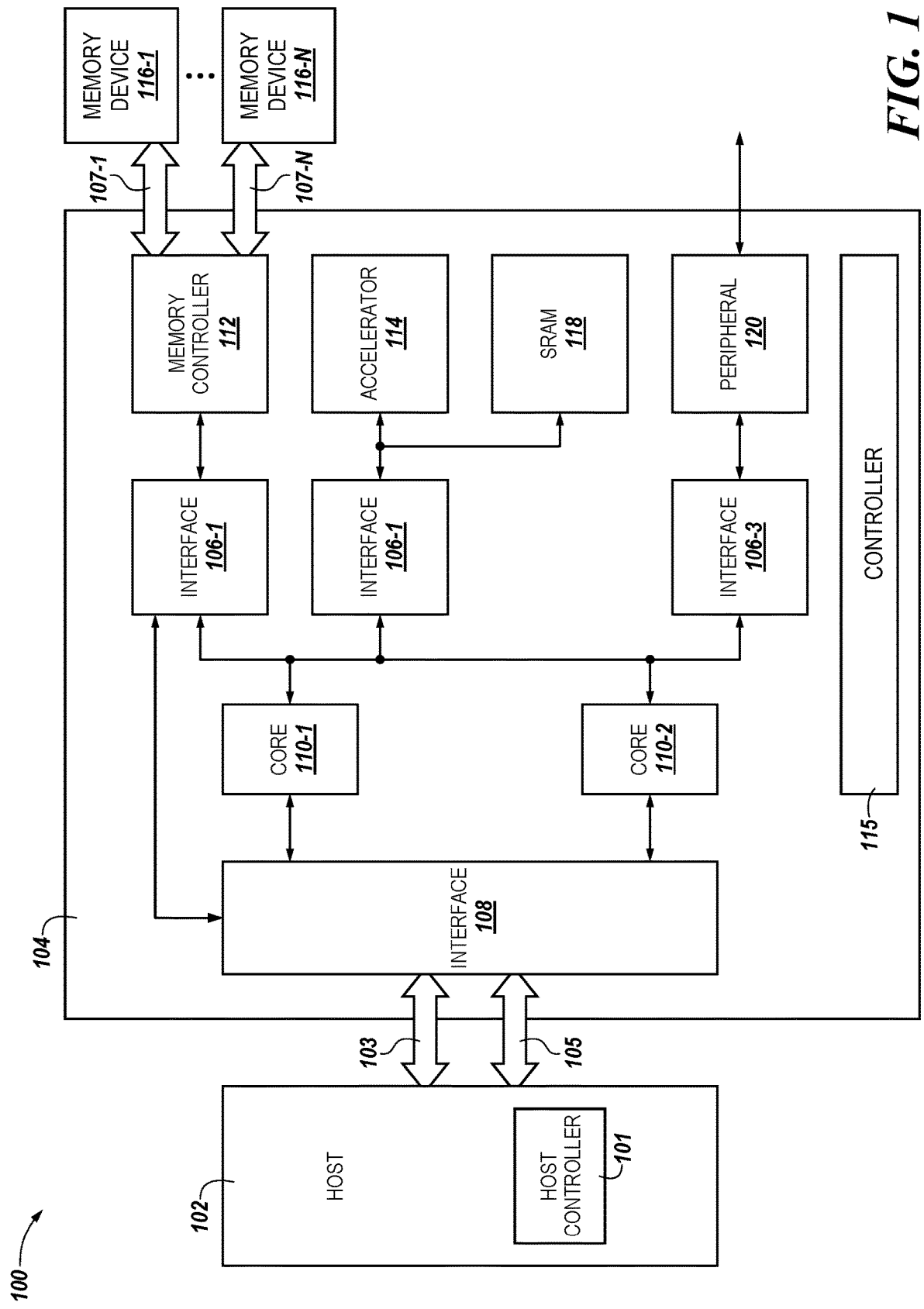
FIG. 1 is a functional block diagram in the form of a computing system including an apparatus including a first communication subsystem, a second plurality of communication subsystems, and a plurality of memory devices in accordance with a number of embodiments of the present disclosure.

Systems, apparatuses, and methods related to extended memory communication subsystems for performing extended memory operations are described. An example apparatus can include a plurality of computing devices coupled to one another. Each of the plurality of computing devices can include a processing unit configured to perform an operation on a block of data in response to receipt of the block of data. Each of the plurality of computing devices can further include a memory array configured as a cache for the processing unit. The example apparatus can further include a first communication subsystems coupled to the plurality of computing devices and to a host and a second plurality of communication subsystems coupled to the plurality of computing devices and to hardware accelerators, SRAM, or additional elements. The first and second plurality of communication subsystems are configured to request and/or transfer the block of data.

An extended memory architecture can transfer instructions to perform operations specified by a single address and operand and may be performed by the computing device that includes a processing unit and a memory resource. The computing device can perform extended memory operations on data streamed through the computing device without receipt of intervening commands. In an example, a computing device is configured to receive a command to perform an operation that comprises performing an operation on data with the processing unit of the computing device and determine that an operand corresponding to the operation is stored in the memory resource. The computing device can further perform the operation using the operand stored in the memory resource.

The computing device can be a RISC-V application processor core, capable of supporting full-featured operating systems such as Linux. This particular core can be used in association with applications such as internet-of-things (IoT) nodes and gateways, storage, and/or networking. The core can be coupled to a number of ports, such as a memory port, a system port, a peripheral port, and/or a front port. As an example, the memory port can be in communication with a memory device, the system port can be in communication with an on-chip accelerator or a "fast" SRAM, the peripheral port can be in communication with an off-chip serial port, and/or the front port can be in communication with a host interface, as will be described further below in association with FIG. 4.

In this way, the first communication subsystems can be used to direct data from a particular port (e.g., a memory port of a computing device) through a communication subsystem (e.g., a multiplexer that selects that particular memory port) and transfer it through an additional communication subsystem (e.g., an interface such as an AXI interconnect interface) to a memory controller that can transfer the data to a memory device (e.g., a DDR memory, a three-dimensional (3-D) cross-point memory, a NAND memory, etc.). In an example, the AXI interconnect interfaces can conform to the AMBA® AXI version 4 specifications from ARM®, including the AXI4-Lite control register interface subset.

As used herein, an "extended memory operation" refers to a memory operation that can be specified by a single address (e.g., a memory address) and an operand, such as a 64-bit operand. An operand can be represented as a plurality of bits (e.g., a bit string or string of bits). Embodiments are not limited to operations specified by a 64-bit operand, however, and the operation can be specified by an operand that is larger (e.g., 128-bits, etc.) or smaller (e.g., 32-bits) than 64-bits. As described herein, the effective address space accessible with which to perform extended memory operations is the size of a memory device or file system accessible to a host computing system or storage controller.

Figure 4:
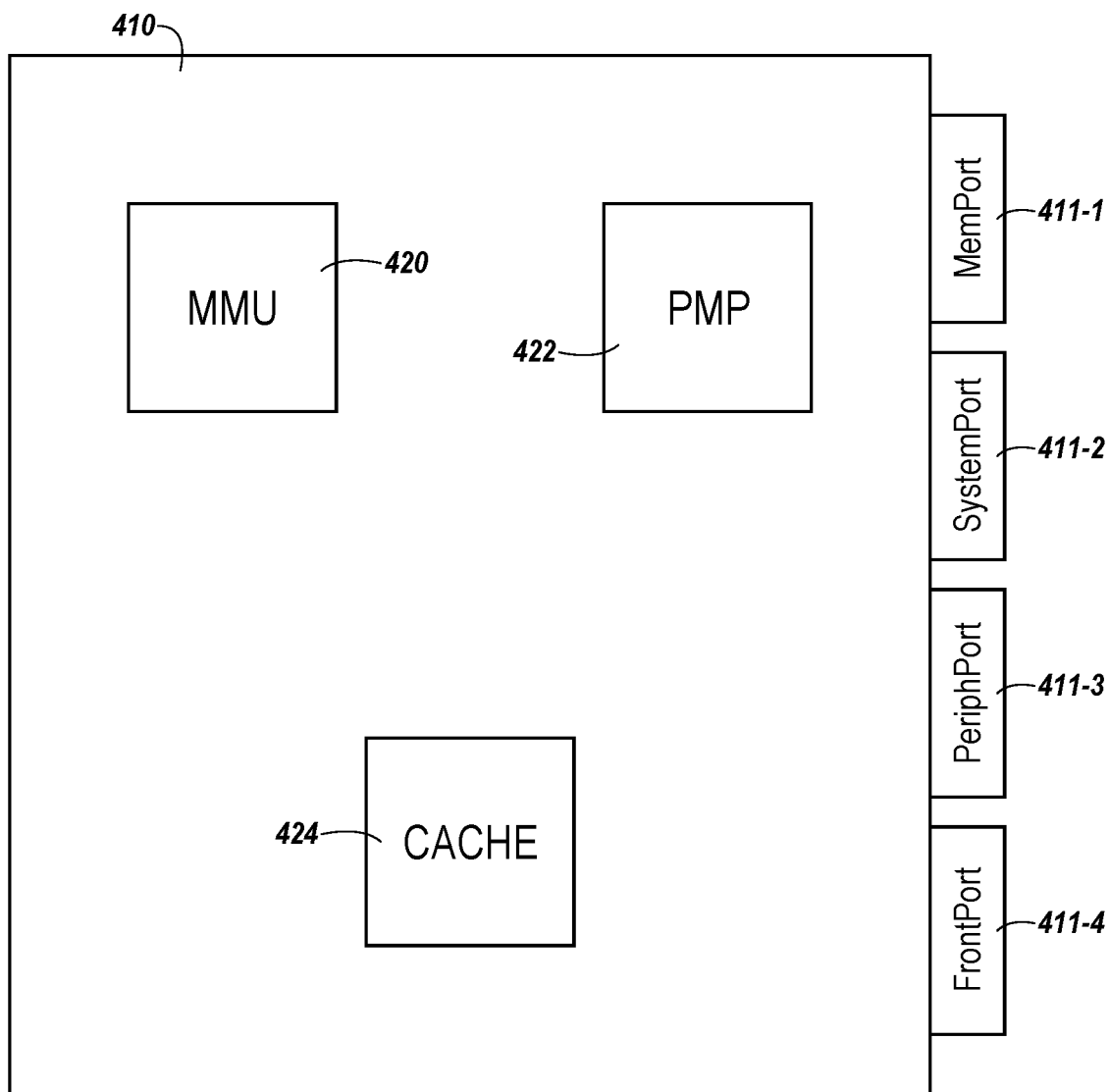
FIG. 4 is a functional block diagram in the form of an apparatus of a computing core including a number of ports in accordance with a number of embodiments of the present disclosure.

Extended memory operations can include instructions and/or operations that can be performed by a processing device (e.g., by a processing device such as a core 110, 210, 310, 410, or a core computing device specifically shown as 410 in FIG. 4). Examples of a core can include a reduced instruction set computing device or other hardware processing device that can execute instructions to perform various computing tasks. In some embodiments, performing an extended memory operation can include retrieving data and/or instructions stored in a memory resource of the computing device, performing the operation within the computing device 110 (e.g., without transferring the data or instructions to circuitry external to the computing device), and storing the result of the extended memory operation in the memory resource of the computing device 110 or in secondary storage (e.g., in a memory device such as the memory device 116-1, 116-2, illustrated in FIG. 1, herein).

Non-limiting examples of extended memory operations can include floating point add accumulate, 32-bit complex operations, square root address (SQRT(addr)) operations, conversion operations (e.g., converting between floating-point and integer formats, and/or converting between floating-point and posit formats), normalizing data to a fixed format, absolute value operations, etc. In some embodiments, extended memory operations can include operations performed by the computing device that update in place (e.g., in which a result of an extended memory operation is stored at the address in which an operand used in performance of the extended memory operation is stored prior to performance of the extended memory operation), as well as operations in which previously stored data is used to determine a new data (e.g., operations in which an operand stored at a particular address is used to generate new data that overwrites the particular address where the operand was stored).+

As a result, in some embodiments, performance of extended memory operations can mitigate or eliminate locking or mutex operations, because the extended memory operation(s) can be performed within the computing device, which can reduce contention between multiple thread execution. Reducing or eliminating performance of locking or mutex operations on threads during performance of the extended memory operations can lead to increased performance of a computing system, for example, because extended memory operations can be performed in parallel within a same computing device or across two or more of the computing devices that are in communication with each other. In addition, in some embodiments, extended memory operations described herein can mitigate or eliminate locking or mutex operations when a result of the extended memory operation is transferred from the computing device that performed the operation to a host.

Memory devices may be used to store important or critical data in a computing device and can transfer, via at least one extended memory architecture, such data between a host associated with the computing device. However, as the size and quantity of data stored by memory devices increases, transferring the data to and from the host can become time consuming and resource intensive. For example, when a host requests performance of memory operations using large blocks of data, an amount of time and/or an amount of resources consumed in obliging the request can increase in proportion to the size and/or quantity of data associated with the blocks of data.

As storage capability of memory devices increases, these effects can become more pronounced as more and more data are able to be stored by the memory device and are therefore available for use in memory operations. In addition, because data may be processed (e.g., memory operations may be performed on the data), as the amount of data that is able to be stored in memory devices increases, the amount of data that may be processed can also increase. This can lead to increased processing time and/or increased processing resource consumption, which can be compounded in performance of certain types of memory operations. In order to alleviate these and other issues, embodiments herein can allow for extended memory operations to be performed using a memory device, one or more computing devices, and/or memory array(s) and a first plurality of communication subsystems (e.g., PCIe interfaces, PCIe XDMA interfaces, AXI interconnect interfaces, etc.) and a second plurality of subsystems (e.g., interfaces such as AXI interconnects) in order to transfer data more efficiently from a computing device to a memory device and/or from a computing device to a host, and vice versa.

In some embodiments, data can be transferred via these communication subsystems to a plurality of memory devices by bypassing the plurality of computing devices. In some embodiments, the data can be transferred via these communication subsystems by passing through at least one of the plurality of computing devices. Each of the interfaces can have a unique speed depending on the route that the data transfers. As will be described further below, when bypassing the plurality of computing devices, the data may be transferred at a higher rate than when the data is passed through at least one of the plurality of computing devices.

In some approaches, performing memory operations can require multiple clock cycles and/or multiple function calls to memory of a computing system such as a memory device and/or memory array. In contrast, embodiments herein can allow for performance of extended memory operations in which a memory operation is performed with a single function call or command. For example, in contrast to approaches in which at least one command and/or function call is utilized to load data to be operated upon and then at least one subsequent function call or command to store the data that has been operated upon is utilized, embodiments herein can allow for performance of memory operations using fewer function calls or commands in comparison to other approaches. Further, the computing devices of the computing system can receive requests to perform the memory operations via a first communication subsystem (e.g., a PCIe interface, a multiplexer, a control network-on-chip, etc.) and/or a second communication subsystem (e.g., an interface, an interconnect such as an AXI interconnect, etc.) and can receive blocks of data for executing the requested memory operations from the memory device via the first communication subsystem and the second communication subsystem. While the first and the second communication subsystem are described in tandem, embodiments are not so limited. As an example, the requests for data and/or receipt of blocks of data can be via the first communication subsystem alone or via the second communication subsystem alone.

By reducing the number of function calls and/or commands utilized in performance of memory operations, an amount of time consumed in performing such operations and/or an amount of computing resources consumed in performance of such operations can be reduced in comparison to approaches in which multiple function calls and/or commands are required for performance of memory operations. Further, embodiments herein can reduce movement of data within a memory device and/or memory array because data may not need to be loaded into a specific location prior to performance of memory operations. This can reduce processing time in comparison to some approaches, especially in scenarios in which a large amount of data is subject to a memory operation.

Further, extended memory operations described herein can allow for a much larger set of type fields in comparison to some approaches. For example, an instruction executed by a host to request performance of an operation using data in a memory device (e.g., a memory sub-system) can include a type, an address, and a data field. The instruction can be sent to at least one of a plurality of computing devices via a first communication subsystem (e.g., a multiplexer) and a second communication subsystem (e.g., an interface) and the data can be transferred from the memory device via the first and/or second communication subsystem. The type field can correspond to the particular operation being requested, the address can correspond to an address in which data to be used in performance of the operation is stored, and the data field can correspond to the data (e.g., an operand) to be used in performing the operation. In some approaches, type fields can be limited to different size reads and/or writes, as well as some simple integer accumulate operations. In contrast, embodiments herein can allow for a broader spectrum of type fields to be utilized because the effective address space that can be used when performing extended memory operations can correspond to a size of the memory device. By extending the address space available to perform operations, embodiments herein can therefore allow for a broader range of type fields and, therefore, a broader spectrum of memory operations can be performed than in approaches that do not allow for an effective address space that is the seize of the memory device.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and structural changes may be made without departing from the scope of the present disclosure.

As used herein, designators such as "X," "Y," "N," "M," "A," "B," "C," "D," etc., particularly with respect to reference numerals in the drawings, indicate that a number of the particular feature so designated can be included. It is also to be understood that the terminology used herein is for the purpose of describing particular embodiments only, and is not intended to be limiting. As used herein, the singular forms "a," "an," and "the" can include both singular and plural referents, unless the context clearly dictates otherwise. In addition, "a number of," "at least one," and "one or more" (e.g., a number of memory banks) can refer to one or more memory banks, whereas a "plurality of" is intended to refer to more than one of such things. Furthermore, the words "can" and "may" are used throughout this application in a permissive sense (i.e., having the potential to, being able to), not in a mandatory sense (i.e., must). The term "include," and derivations thereof, means "including, but not limited to." The terms "coupled" and "coupling" mean to be directly or indirectly connected physically or for access to and movement (transmission) of commands and/or data, as appropriate to the context. The terms "data" and "data values" are used interchangeably herein and can have the same meaning, as appropriate to the context.

The figures herein follow a numbering convention in which the first digit or digits correspond to the figure number and the remaining digits identify an element or component in the figure. Similar elements or components between different figures may be identified by the use of similar digits. For example, 104 may reference element "04" in FIG. 1, and a similar element may be referenced as 204 in FIG. 2. A group or plurality of similar elements or components may generally be referred to herein with a single element number. For example, a plurality of reference elements 106-1, 106-2, 106-3 may be referred to generally as 106. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

FIG. 1 is a functional block diagram in the form of a computing system 100 including an apparatus 104 including a first communication subsystem 108, a second plurality of communication subsystems 106, and a plurality of memory devices 116 in accordance with a number of embodiments of the present disclosure. As used herein, an "apparatus" can refer to, but is not limited to, any of a variety of structures or combinations of structures, such as a circuit or circuitry, a die or dice, a module or modules, a device or devices, or a system or systems, for example. In the embodiment illustrated in FIG. 1, memory devices 116-1 . . . 116-N can include one or more memory modules (e.g., double data rate (DDR) memory, three-dimensional (3D) cross-point memory, NAND memory, single in-line memory modules, dual in-line memory modules, etc.). The memory devices 116-1, . . . , 116-N can include volatile memory and/or non-volatile memory. In a number of embodiments, memory devices 116-1, . . . , 116-N can include a multi-chip device. A multi-chip device can include a number of different memory types and/or memory modules. For example, a memory system can include non-volatile or volatile memory on any type of a module.

The memory devices 116-1, . . . , 116-N can provide main memory for the computing system 100 or could be used as additional memory or storage throughout the computing system 100. Each memory device 116-1, . . . , 116-N can include one or more arrays of memory cells, e.g., volatile and/or non-volatile memory cells. The arrays can be flash arrays with a NAND architecture, for example. Embodiments are not limited to a particular type of memory device. For instance, the memory device can include RAM, ROM, DRAM, SDRAM, PCRAM, RRAM, and flash memory, among others.

In embodiments in which the memory devices 116-1, . . . , 116-N include non-volatile memory, the memory devices 116-1, . . . , 116-N can be flash memory devices such as NAND or NOR flash memory devices. Embodiments are not so limited, however, and the memory devices 116-1, . . . , 116-N can include other non-volatile memory devices such as non-volatile random-access memory devices (e.g., NVRAM, ReRAM, FeRAM, MRAM, PCM), "emerging" memory devices such as 3-D Crosspoint (3D XP) memory devices, etc., or combinations thereof. A 3D XP array of non-volatile memory can perform bit storage based on a change of bulk resistance, in conjunction with a stackable cross-gridded data access array. Additionally, in contrast to many flash-based memories, 3D XP non-volatile memory can perform a write in-place operation, where a non-volatile memory cell can be programmed without the non-volatile memory cell being previously erased.

As illustrated in FIG. 1, a plurality of computing devices 110-1, 110-2 (hereinafter referred to collectively as plurality of computing devices 110) can be coupled to a communication subsystem (e.g., a peripheral component interconnect express (PCIe) interface, a PCIe XDMA interface, etc.) 108. The communication subsystem 108 can include circuitry and/or logic configured to allocate and de-allocate resources to the computing devices 110 from or to the host 102 during performance of operations described herein. For example, the circuitry and/or logic can communicate data requests or allocate and/or de-allocate resources to the computing devices 110 during performance of extended memory operations described herein.

The communication subsystem 108 can be directly coupled to at least one 106-1 of a plurality of communication subsystems 106 (e.g., interfaces such as an interconnect interface) 106-1, 106-2, 106-3, 106 (hereinafter referred to collectively as plurality of communication subsystems 106). Each of the plurality of communication subsystems 106 can be coupled to a corresponding one of a controller 112, an accelerator 114, an SRAM (e.g., a fast SRAM) 118, and a peripheral component 120. In one example, a first 106-1 of the plurality of communication subsystems 106 can be coupled to the controller 112. In this example, the interface 106-1 can be a memory interface. The controller 112 can be coupled to a number of memory devices 116-1, . . . , 116-N via a number of channels 107-1, . . . , 107-N.

Second, in this example, and as is illustrated in FIG. 1, a second 106-2 of the plurality of communication subsystems 106 can be coupled to an accelerator 114 and an SRAM 118. The on-chip accelerator 114 can be used for performing a number of posit operations, and/or for communication with an internal SRAM on a field programmable gate array (FPGA) that includes a number of the components being described. As an example, the components of the apparatus 104 can be on the FPGA.

Third, in this example, a third 106-3 of the plurality of communication subsystems 106 can be coupled to a peripheral component 120. The peripheral component 120 can be one of a general purpose input/output (GPID) LED or a universal asynchronous receiver/transmitter (UART). The GPID LED can be further coupled to additional LEDs and the UART can be further coupled to a serial port. The plurality of communication subsystems 106 can be coupled to each corresponding component via a number of AXI buses. The third (106-3) of the plurality of communication subsystems 106 can be used for transferring data off-chip through the peripheral component 120 or an off-chip serial port 118.

The host 102 can be a host system such as a personal laptop computer, a desktop computer, a digital camera, a smart phone, a memory card reader, and/or internet-of-things enabled device, among various other types of hosts, and can include a memory access device, e.g., a processor (or processing device). One of ordinary skill in the art will appreciate that "a processor" can intend one or more processors, such as a parallel processing system, a number of coprocessors, etc. The host 102 can include a system motherboard and/or backplane and can include a number of processing resources (e.g., one or more processors, microprocessors, or some other type of controlling circuitry). In some embodiments, the host can include the host controller 101, which can be configured to control at least some operations of the host 102 by, for example, generating and transferring commands to the host controller to cause performance of operations such as extended memory operations. The host controller 101 can include circuitry (e.g., hardware) that can be configured to control at least some operations of the host 102. For example, the host controller 101 can be an application specific integrated circuit (ASIC), a field programmable gate array (FPGA), or other combination of circuitry and/or logic configured to control at least some operations of the host 102. The host 102 can communicate, via channels 103/105, with the host interface 108.

The system 100 can include separate integrated circuits or the host 102, the communication subsystem 108, the plurality of communication subsystems 106, the controller 112, the on-chip accelerator 114, the SRAM 118, the peripheral components 120, and/or the memory devices 116-1, . . . , 116-N can be on the same integrated circuit. The system 100 can be, for instance, a server system and/or a high performance computing (HPC) system and/or a portion thereof. Although the example shown in FIG. 1 illustrate a system having a Von Neumann architecture, embodiments of the present disclosure can be implemented in non-Von Neumann architectures, which may not include one or more components (e.g., CPU, ALU, etc.) often associated with a Von Neumann architecture.

The controller 112 can be configured to request a block of data from one or more of the memory devices 116-1, . . . , 116-N and cause the cores 110-1, . . . , 110-N, which may be referred to in the alternative as "computing devices," herein, to perform an operation (e.g., an extended memory operation) on the block of data. The operation may be performed to evaluate a function that can be specified by a single address and one or more operands associated with the block of data. The controller 112 can be further configured to cause a result of the extended memory operation to be stored in one or more of the computing devices 110-1, . . . , 110-N through the plurality of communication subsystems 106 and/or to be transferred to a channel (e.g., communication paths 103 and/or 105) and/or the host 102.

In some embodiments, the plurality of communication subsystems 106 can request a remote command, start a DMA command, send a read/write location, and/or send a start function execution command to one of the plurality of computing devices 110. In some embodiments, the plurality of communication subsystems 106 can request that a block of data be copied from a buffer of a computing device 110 to a buffer of a memory controller 112 or memory device 116. Vice versa, one of the plurality of communication subsystems 106 can request that a block of data be copied to the buffer of the computing device 110 from the buffer of the memory controller 112 or memory device 116. The plurality of communication subsystems 106 can request that a block of data be copied to a computing device 110 from a buffer of the host 102 or, vice versa, request that a block of data be copied from a computing device 110 to a host 102. The plurality of communication subsystems 106 can request that a block of data be copied to a buffer of the host 102 from a buffer of the memory controller 112 or memory device 116. Vice versa, the plurality of communication subsystems 106 can request that a block of data be copied from a buffer of the host 102 to a buffer of the memory controller 112 or memory device 116. Further, in some embodiments, the plurality of communication subsystems 106 can request that a command from a host be executed on a computing device 110. The plurality of communication subsystems 106 can request that a command from a computing device 110 be executed on an additional computing device 110. The plurality of communication subsystems 106 can request that a command from a memory controller 112 be executed on a computing device 110. In some embodiments, the plurality of communication subsystems 106 can include at least a portion of a controller (not illustrated).

In some embodiments, the plurality of communication subsystems 106 can transfer a block of data (e.g., a direct memory access (DMA) block of data) from a computing device 110 to a media device 116 (via the memory controller 112) or, vice versa, can transfer a block of data to a computing device 110 from a media device 116. The plurality of communication subsystems 106 transfer a block of data (e.g., a DMA block) from a computing device 110 to a host 102 or, vice versa, to a computing device 110 from a host 102. Further, the plurality of communication subsystems 106 can transfer a block of data (e.g., a DMA block) from a host 102 to a media device 116 or, vice versa, to a host 102 from a media device 116. In some embodiments, the plurality of communication subsystems 106 can receive an output (e.g., data on which an extended memory operation has been performed) from the computing devices 110-1, . . . , 110-N and transfer the output from the computing devices 110-1, . . . , 110-N to a controller 115 of the apparatus 104 and/or the host 102, and vice versa. For example, the plurality of communication subsystems 106 may be configured to receive data that has been subjected to an extended memory operation by the computing devices 110-1, . . . , 110-N and transfer the data that corresponds to the result of the extended memory operation to a controller 115 and/or the host 102. In some embodiments, the plurality of communication subsystems 106 can include at least a portion of the controller 115. For example, the plurality of communication subsystems 106 can include the circuitry that comprises the controller 115, or a portion thereof.

The memory controller 112 can be a "standard" or "dumb" memory controller. For example, the memory controller 112 can be configured to perform simple operations such as copy, write, read, error correct, etc. for the memory devices 116-1, . . . , 116-N. However, in some embodiments, the memory controller 112 does not perform processing (e.g., operations to manipulate data) on data associated with the memory devices 116-1, . . . , 116-N. For example, the memory controller 112 can cause a read and/or write operation to be performed to read or write data from or to the memory devices 116-1, . . . , 116-N via the communication paths 107-1, . . . , 107-N, but the memory controller 112 may not perform processing on the data read from or written to the memory devices 116-1, . . . , 116-N. In some embodiments, the memory controller 112 can be a non-volatile memory controller, although embodiments are not so limited.

In some embodiments, a first AXI bus that couples the communication subsystem 108 to the first 106-1 of the plurality of communication subsystems 106 is an AXI bus able to transfer data faster than a second AXI bus that couples the communication subsystem 108 to the computing device 110-1. As an example, the first AXI bus can transfer at a rate of 300 MHz while the second AXI bus can transfer at a rate of 100 MHz. Further, the first AXI bus can be an AXI bus able to transfer data faster than a third AXI bus that couples the computing device 110-1 to one of the plurality of communication subsystems 106.

The embodiment of FIG. 1 can include additional circuitry that is not illustrated so as not to obscure embodiments of the present disclosure. For example, the apparatus 104 can include address circuitry to latch address signals provided over I/O connections through I/O circuitry. Address signals can be received and decoded by a row decoder and a column decoder to access the memory devices 116-1, . . . , 116-N. It will be appreciated by those skilled in the art that the number of address input connections can depend on the density and architecture of the memory devices 116-1, . . . , 116-N.

In some embodiments, extended memory operations can be performed using the computing system 100 shown in FIG. 1 by selectively storing or mapping data (e.g., a file) into a computing device 110. The data can be selectively stored in an address space of the computing memory. In some embodiments, the data can be selectively stored or mapped in the computing device 110 in response to a command received from the host 102. In embodiments in which the command is received from the host 102, the command can be transferred to the computing device 110 via an interface (e.g., communication paths 103 and/or 105) associated with the host 102 and via the communication subsystem and the plurality of communication subsystems 108 and 106, respectively. The interface(s) 103/105, communication subsystem 108 and the plurality of communication subsystems 106 can be peripheral component interconnect express (PCIe) buses, double data rate (DDR) interfaces, interconnect interfaces (such as AXI interconnect interfaces), multiplexers (muxes), or other suitable interfaces or buses. Embodiments are not so limited, however.

In a non-limiting example in which the data (e.g., in which data to be used in performance of an extended memory operation) is mapped into the computing device 110, the host controller 101 can transfer a command to the computing device 110 to initiate performance of an extended memory operation using the data mapped into the computing device 110. In some embodiments, the host controller 101 can look up an address (e.g., a physical address) corresponding to the data mapped into the computing device 110 and determine, based on the address, which computing device (e.g., the computing device 110-1) the address (and hence, the data) is mapped to. The command can then be transferred to the computing device (e.g., the computing device 110-1) that contains the address (and hence, the data).

In some embodiments, the data can be a 64-bit operand, although embodiments are not limited to operands having a specific size or length. In an embodiment in which the data is a 64-bit operand, once the host controller 101 transfers the command to initiate performance of the extended memory operation to the correct computing device (e.g., the computing device 110-1) based on the address at which the data is stored, the computing device (e.g., the computing device 110-1) can perform the extended memory operation using the data.

In some embodiments, the computing devices 110 can be separately addressable across a contiguous address space, which can facilitate performance of extended memory operations as described herein. That is, an address at which data is stored, or to which data is mapped, can be unique for all the computing devices 110 such that when the host controller 101 looks up the address, the address corresponds to a location in a particular computing device (e.g., the computing device 110-1).

For example, a first computing device 110-1 can have a first set of addresses associated therewith, a second computing device 110-2 can have a second set of addresses associated therewith, a third computing device 110-3 can have a third set of addresses associated therewith, through the n-th computing device (e.g., the computing device 110-N), which can have an n-th set of addresses associated therewith. That is, the first computing device 110-1 can have a set of addresses 0000000 to 0999999, the second computing device 110-2 can have a set of addresses 1000000 to 1999999, the third computing device 110-3 can have a set of addresses 2000000 to 2999999, etc. It will be appreciated that these address numbers are merely illustrative, non-limiting, and can be dependent on the architecture and/or size (e.g., storage capacity) of the computing devices 110.

As a non-limiting example in which the extended memory operation comprises a floating-point-add-accumulate operation (FLOATINGPOINT_ADD_ACCUMULATE), the computing devices 110 can treat the destination address as a floating-point number, add the floating-point number to the argument stored at the address of the computing device 110, and store the result back in the original address. For example, when the host controller 101 (or an apparatus controller 115, not shown) initiates performance of a floating-point add accumulate extended memory operation, the address of the computing device 110 that the host looks up (e.g., the address in the computing device to which the data is mapped) can be treated as a floating-point number and the data stored in the address can be treated as an operand for performance of the extended memory operation. Responsive to receipt of the command to initiate the extended memory operation, the computing device 110 to which the data (e.g., the operand in this example) is mapped can perform an addition operation to add the data to the address (e.g., the numerical value of the address) and store the result of the addition back in the original address of the computing device 110.

As described above, performance of such extended memory operations can, in some embodiments require only a single command (e.g., request command) to be transferred from the host 102 (e.g., from the host controller 101) to the memory device 104 or from the controller 115 to the computing device(s) 110. In contrast to some previous approaches, this can reduce an amount of time, for example, for multiple commands to traverse the interface(s) 103, 105 and/or for data, such as operands to be moved from one address to another within the computing device(s) 110, consumed in performance of operations.

In addition, performance of extended memory operations in accordance with the disclosure can further reduce an amount of processing power or processing time since the data mapped into the computing device 110 in which the extended memory operation is performed can be utilized as an operand for the extended memory operation and/or the address to which the data is mapped can be used as an operand for the extended memory operation, in contrast to approaches in which the operands must be retrieved and loaded from different locations prior to performance of operations. That is, at least because embodiments herein allow for loading of the operand to be skipped, performance of the computing system 100 may be improved in comparison to approaches that load the operands and subsequently store a result of an operations performed between the operands.

Further, in some embodiments, because the extended memory operation can be performed within a computing device 110 using the address and the data stored in the address and, in some embodiments, because the result of the extended memory operation can be stored back in the original address, locking or mutex operations may be relaxed or not required during performance of the extended memory operation. Reducing or eliminating performance of locking or mutex operations on threads during performance of the extended memory operations can lead to increased performance of the computing system 100 because extended memory operations can be performed in parallel within a same computing device 110 or across two or more of the computing devices 110.

In some embodiments, valid mappings of data in the computing devices 110 can include a base address, a segment size, and/or a length. The base address can correspond to an address in the computing device 110 in which the data mapping is stored. The segment size can correspond to an amount of data (e.g., in bytes) that the computing system 100 can process, and the length can correspond to a quantity of bits corresponding to the data. It is noted that, in some embodiments, the data stored in the computing device(s) 110 can be uncacheable on the host 102. For example, the extended memory operations can be performed entirely within the computing devices 110 without encumbering or otherwise transferring the data to or from the host 102 during performance of the extended memory operations.

In a non-limiting example in which the base address is 4096, the segment size is 1024, and the length is 16,386, a mapped address, 7234, may be in a third segment, which can correspond to a third computing device (e.g., the computing device 210-3 in FIG. 2) among the plurality of computing devices 110. In this example, the host 102 and/or the communication subsystem 108 and plurality of communication subsystems 106 can forward a command (e.g., a request) to perform an extended memory operation to the third computing device (210-3). The third computing device (210-3) can determine if data is stored in the mapped address in a memory of the third computing device (210-3). If data is stored in the mapped address (e.g., the address in the third computing device (210-3), the third computing device (210-3) can perform a requested extended memory operation using that data and can store a result of the extended memory operation back into the address in which the data was originally stored.

In some embodiments, the computing device 110 that contains the data that is requested for performance of an extended memory operation can be determined by the host controller 101, and/or the communication subsystem 108 and/or plurality of communication subsystems 106. For example, a portion of a total address space available to all the computing devices 110 can be allocated to each respective computing device. Accordingly, the host controller 101 and/or the communication subsystem 108 and/or plurality of communication subsystems 106 can be provided with information corresponding to which portions of the total address space correspond to which computing devices 110 and can therefore direct the relevant computing devices 110 to perform extended memory operations. In some embodiments, the host controller 101 and/or the second 106 communication subsystems can store addresses (or address ranges) that correspond to the respective computing devices 110 in a data structure, such as a table, and direct performance of the extended memory operations to the computing devices 110 based on the addresses stored in the data structure.

Embodiments are not so limited, however, and in some embodiments, the host controller 101 and/or the plurality of communication subsystems 106 can determine a size (e.g., an amount of data) of the memory resource(s) and, based on the size of the memory resource(s) associated with each computing device 110 and the total address space available to all the computing devices 110, determine which computing device 110 stores data to be used in performance of an extended memory operation. In embodiments in which the host controller 101 and/or the plurality of communication subsystems 106 determine the computing device 110 that stores the data to be used in performance of an extended memory operation based on the total address space available to all the computing devices 110 and the amount of memory resource(s) available to each computing device 110, it can be possible to perform extended memory operations across multiple non-overlapping portions of the computing device memory resource(s).

Continuing with the above example, if there is not data in the requested address, the third computing device (210-3) can request the data as described in more detail in connection with FIG. 2, herein, and perform the extended memory operation once the data is loaded into the address of the third computing device (210-3). In some embodiments, once the extended memory operation is completed by the computing device (e.g., the third computing device 210-3 in this example), and/or the host 102 can be notified and/or a result of the extended memory operation can be transferred to the memory devices 116 and/or the host 102.

In some embodiments, the memory controller 112 can be configured to retrieve blocks of data from a memory device(s) 116-1, ..., 116-N coupled to the apparatus 104 in response to a request from a controller of the apparatus 104 or a host 102. The memory controller 112 can subsequently cause the blocks of data to be transferred to the computing devices 110-1, ..., 110-N and/or the apparatus controller. Similarly, the memory controller 112 can be configured to receive blocks of data from the computing devices 110 and/or the controller 115. The memory controller 112 can subsequently cause the blocks of data to be transferred to a memory device 116 coupled to the storage controller 104.

The blocks of data can be approximately 4 kilobytes in size (although embodiments are not limited to this particular size) and can be processed in a streaming manner by the computing devices 110-1, ..., 110-N in response to one or more commands generated by the controller 115 and/or a host and sent via the second communication subsystems 106. In some embodiments, the blocks of data can be 32-bit, 64-bit, 128-bit, etc. words or chunks of data, and/or the blocks of data can correspond to operands to be used in performance of an extended memory operation.

For example, as described in more detail in connection with FIG. 2, herein, because the computing devices 110 can perform an extended memory operation (e.g., process) a second block of data in response to completion of performance of an extended memory operation on a preceding block of data, the blocks of data can be continuously streamed through the computing devices 110 while the blocks of data are being processed by the computing devices 110. In some embodiments, the blocks of data can be processed in a streaming fashion through the computing devices 110 in the absence of an intervening command from the controller and/or the host 102. That is, in some embodiments, the controller 115 (or host 102) can issue a command to cause the computing devices 110 to process blocks of data received thereto and blocks of data that are subsequently received by the computing devices 110 can be processed in the absence of an additional command from the controller.

In some embodiments, processing the blocks of data can include performing an extended memory operation using the blocks of data. For example, the computing devices 110-1, ..., 110-N can, in response to commands from the controller via the plurality of communication subsystems 106, perform extended memory operations the blocks of data to evaluate one or more functions, remove unwanted data, extract relevant data, or otherwise use the blocks of data in connection with performance of an extended memory operation.

In a non-limiting example in which the data (e.g., in which data to be used in performance of an extended memory operation) is mapped into one or more of the computing devices 110, the controller can transfer a command to the computing device 110 to initiate performance of an extended memory operation using the data mapped into the computing device(s) 110. In some embodiments, the controller 115 can look up an address (e.g., a physical address) corresponding to the data mapped into the computing device(s) 110 and determine, based on the address, which computing device (e.g., the computing device 110-1) the address (and hence, the data) is mapped to. The command can then be transferred to the computing device (e.g., the computing device 110-1) that contains the address (and hence, the data). In some embodiments, the command can be transferred to the computing device (e.g., the computing device 110-1) via the second communication subsystem 106.

The controller 115 (or a host) can be further configured to send commands to the computing devices 110 to allocate and/or de-allocate resources available to the computing devices 110 for use in performing extended memory operations using the blocks of data. In some embodiments, allocating and/or de-allocating resources available to the computing devices 110 can include selectively enabling some of the computing devices 110 while selectively disabling some of the computing devices 110. For example, if less than a total number of computing devices 110 are required to process the blocks of data, the controller 115 can send a command to the computing devices 110 that are to be used for processing the blocks of data to enable only those computing devices 110 desired to process the blocks of data.

The controller 115 can, in some embodiments, be further configured to send commands to synchronize performance of operations, such as extended memory operations, performed by the computing devices 110. For example, the controller 115 (and/or a host) can send a command to a first computing device 110-1 to cause the first computing device 110-1 to perform a first extended memory operation, and the controller 115 (or the host) can send a command to a second computing device 110-2 to perform a second extended memory operation using the second computing device. Synchronization of performance of operations, such as extended memory operations, performed by the computing devices 110 by the controller 115 can further include causing the computing devices 110 to perform particular operations at particular time or in a particular order.

As described above, data that results from performance of an extended memory operation can be stored in the original address in the computing device 110 in which the data was stored prior to performance of the extended memory operation, however, in some embodiments, blocks of data that result from performance of the extended memory operation can be converted into logical records subsequent to performance of the extended memory operation. The logical records can comprise data records that are independent of their physical locations. For example, the logical records may be data records that point to an address (e.g., a location) in at least one of the computing devices 110 where physical data corresponding to performance of the extended memory operation is stored.

In some embodiments, the result of the extended memory operation can be stored in an address of a computing device memory that is the same as the address in which the data is stored prior to performance of the extended memory operation. Embodiments are not so limited, however, and the result of the extended memory operation can be stored in an address of the computing device memory that is the same as the address in which the data is stored prior to performance of the extended memory operation. In some embodiments, the logical records can point to these address locations such that the result(s) of the extended memory operation can be accessed from the computing devices 110 and transferred to circuitry external to the computing devices 110 (e.g., to a host).

In some embodiments, the controller 115 can receive and/or send blocks of data directly to and from the memory controller 112. This can allow the controller 115 to transfer blocks of data that are not processed (e.g., blocks of data that are not used in performance of extended memory operations) by the computing devices 110 to and from the memory controller 112.

For example, if the controller 115 receives unprocessed blocks of data from a host 102 coupled to the storage controller 104 that are to be stored by memory device(s) 116 coupled to the storage controller 104, the controller 115 can cause the unprocessed blocks of data to be transferred to the memory controller 112, which can, in turn, cause the unprocessed blocks of data to be transferred to memory device(s) coupled to the storage controller 104.

Similarly, if the host requests an unprocessed (e.g., a full) block of data (e.g., a block of data that is not processed by the computing devices 110), the memory controller 112 can cause unprocessed blocks of data to be transferred to the controller 115, which can subsequently transfer the unprocessed blocks of data to the host.

Figure 2:
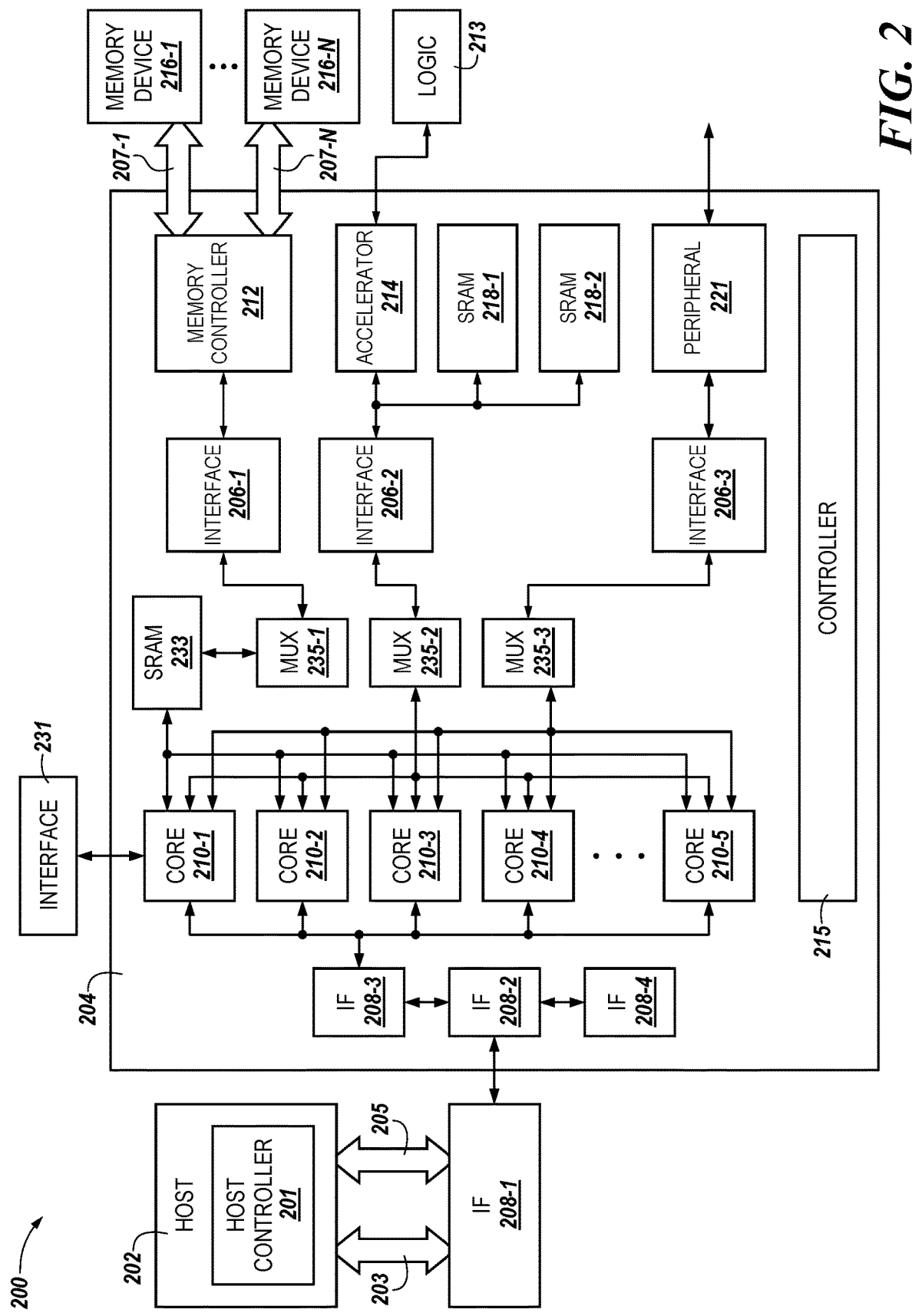
FIG. 2 is yet another functional block diagram in the form of a computing system including an apparatus including a first plurality of communication subsystems, a second plurality of communication subsystems, and a plurality of memory devices in accordance with a number of embodiments of the present disclosure.

FIG. 2 is a functional block diagram in the form of a computing system 200 including an apparatus 204 including a first plurality of communication subsystems 208, a second plurality of communication subsystems 206, and a plurality of memory devices 216 in accordance with a number of embodiments of the present disclosure. As used herein, an "apparatus" can refer to, but is not limited to, any of a variety of structures or combinations of structures, such as a circuit or circuitry, a die or dice, a module or modules, a device or devices, or a system or systems, for example. In the embodiment illustrated in FIG. 2, memory devices 216-1 . . . 216-N can include one or more memory modules (e.g., double data rate (DDR) memory, three-dimensional (3D) cross-point memory, NAND memory, single in-line memory modules, dual in-line memory modules, etc.). The memory devices 216-1, . . . , 216-N can include volatile memory and/or non-volatile memory. In a number of embodiments, memory devices 216-1, . . . , 216-N can include a multi-chip device. A multi-chip device can include a number of different memory types and/or memory modules. For example, a memory system can include non-volatile or volatile memory on any type of a module.

The memory devices 216-1, . . . , 216-N can provide main memory for the computing system 200 or could be used as additional memory or storage throughout the computing system 100. Each memory device 216-1, . . . , 216-N can include one or more arrays of memory cells, e.g., volatile and/or non-volatile memory cells. The arrays can be flash arrays with a NAND architecture, for example. Embodiments are not limited to a particular type of memory device. For instance, the memory device can include RAM, ROM, DRAM, SDRAM, PCRAM, RRAM, and flash memory, among others.

In embodiments in which the memory devices 216-1, . . . , 216-N include non-volatile memory, the memory devices 216-1, . . . , 216-N can be flash memory devices such as NAND or NOR flash memory devices. Embodiments are not so limited, however, and the memory devices 216-1, . . . , 216-N can include other non-volatile memory devices such as non-volatile random-access memory devices (e.g., NVRAM, ReRAM, FeRAM, MRAM, PCM), "emerging" memory devices such as 3-D Crosspoint (3D XP) memory devices, etc., or combinations thereof. A 3D XP array of non-volatile memory can perform bit storage based on a change of bulk resistance, in conjunction with a stackable cross-gridded data access array. Additionally, in contrast to many flash-based memories, 3D XP non-volatile memory can perform a write in-place operation, where a non-volatile memory cell can be programmed without the non-volatile memory cell being previously erased.

As illustrated in FIG. 2, a host 202 can include a host controller 201. The host 102 can be in communication via channels 203/205 to a first 208-1 of the first communication subsystems ("IF" 208-1). IF 208-1 can be a PCIe interface. IF 208-1 can be coupled to a second 208-2 of the first plurality of communication subsystems 208 ("IF" 208-2). IF 208-2 can be a PCIe XDMA interface. IF 208-2 can be coupled to a third 208-3 of the first plurality of communication subsystems 208 ("IF" 208-3). IF 208-3 can be coupled to each of the plurality of computing devices 210.

Further, IF 208-2 can be coupled to a fourth 208-4 of the first plurality of communication subsystems 208 ("IF" 208-4). IF 208-4 can be a message passing interface (MPI). For example, the host 202 can send a message that is receives by the IF 208-4 and held by the IF 208-4 until a computing device 210 or an additional interface 208 retrieves the message in order to determine a subsequent action. The subsequent possible actions can include executing a specific function on a particular computing device 210, setting reset vectors for external interfaces 231, or reading/modifying SRAM 233 locations. In the alternative, the computing devices 210 can write a message received by the IF 208-4 for the host 202 to access. The host controller 201 can read the message from the IF 208-4 and transfer data to or from a device (such as SRAM 233, registers in the computing devices 210, or locations in the memory devices 216 and/or the host memory (such as registers, caches, or main memory)). IF 208-4 can also include host registers and/or reset vectors for controlling selection of an external interface, such as interface 231. In at least one example, the external interface 231 can be a JTAG interface 231 and IF 208-4 can be used for JTAG selection.

As illustrated in FIG. 2, a plurality of computing devices 210-1, 210-2, 210-3, 210-4, 210-5 (hereinafter referred to collectively as plurality of computing devices 210) can be coupled to an SRAM 209. The plurality of computing devices 210 can be coupled to the SRAM 209 through a bus matrix. Further, the plurality of computing devices 210 can be coupled to an additional plurality of communication subsystems (e.g., multiplexers) 235-1, 235-2, 235-3. The first communication subsystems 208 and/or the additional plurality of communication subsystems 235 can include circuitry and/or logic configured to allocate and de-allocate resources to the computing devices 210 during performance of operations described herein. For example, the circuitry and/or logic can allocate and/or de-allocate resources to the computing devices 210 during performance of extended memory operations described herein.

As illustrated in FIG. 2, and in contrast to FIG. 1, a plurality of computing devices 210-1, 210-2, 210-3, 210-4, 210-5 (hereinafter referred to collectively as plurality of computing devices 210) can be coupled to an SRAM 233. Further, the plurality of computing devices 210 can each be coupled to an additional communication subsystem (e.g., multiplexers) 235-1 (through SRAM 233), 235-2, and 235-3. The additional communication subsystems 235 can include circuitry and/or logic configured to allocate and de-allocate resources to the computing devices 210 during performance of operations described herein. For example, the circuitry and/or logic can allocate and/or de-allocate resources to the computing devices 210 during performance of extended memory operations described herein. While the examples described above include an SRAM coupled to each of the computing devices (such as in FIG. 2 or can include an SRAM within each of the computing devices (not illustrated), examples are not so limited. For example, a cache such as an SRAM can be at multiple locations such as external to the apparatus 204, internal to the apparatus 204, etc.

The additional plurality of communication subsystems 235 can be coupled to a second plurality of communication subsystems (e.g., interfaces such as an interconnect interface) 206-1, 206-2, 206-3, 206-4 (hereinafter referred to collectively as second plurality of communication subsystems 206). Each of the second plurality of communication subsystems 206 can be coupled to a corresponding one of a controller 212, an accelerator 214, a plurality of SRAMs 218-1, 218-2, and a peripheral component 221. In one example, the second plurality of communication subsystems 206 can be coupled to the corresponding controller 212, accelerator 214, plurality of SRAMs 218, and or peripheral component 221 via a number of AXI buses.

As is illustrated, a first (206-1) of the second plurality of communication subsystems 206 can be coupled to the controller (e.g., memory controller) 212. The controller 212 can be coupled to a number of memory devices 216-1, . . . , 216-N via a number of channels 207-1, . . . , 207-N. A second (206-2) of the second plurality of communication subsystems 206 can be coupled to an accelerator 214 and a plurality of SRAMs 218-1, 218-2. The accelerator 214 can be coupled to logic circuitry 213. The logic circuitry 213 can be on a same field programmable gate array (FPGA) as the computing devices 210, first plurality of communication subsystems 208, second plurality of communication subsystems 206, etc. The logic circuitry 213 can include on-chip accelerators for performing a number of posit operations, and/or for communication with an internal SRAM (218) on the FPGA. A third (206-3) of the second plurality of communication subsystems 206 can be used for transferring data off-chip through a peripheral component 221.

In some embodiments, a first plurality of AXI buses that couple the IF 208-3 to the plurality of computing devices 210, couple the plurality of computing devices 210 to the additional plurality of communication subsystems 235, and couple the second plurality of communication subsystems 206 to the controller 212, accelerator 214, SRAMs 218, or peripheral component 221 can use a faster AXI bus transfer speed than a second plurality of AXI buses that couple the IF 208-2 to the IF 208-3 and to the IF 208-4. As an example, the first plurality of AXI buses can have a transfer rate of within a range of 50-150 MHz, 100 MHz, etc. and the second plurality of AXI buses can have a transfer rate of within a range of 150-275 MHz, 250 MHz, etc. A third AXI bus can couple the IF 208-3 to the communication subsystem 206-1 and can have a faster transfer rate than the first or second plurality of AXI buses. As an example, the third AXI bus can have a transfer rate of within a range of 250-350 MHz, 300 MHz, etc.

Figure 3:
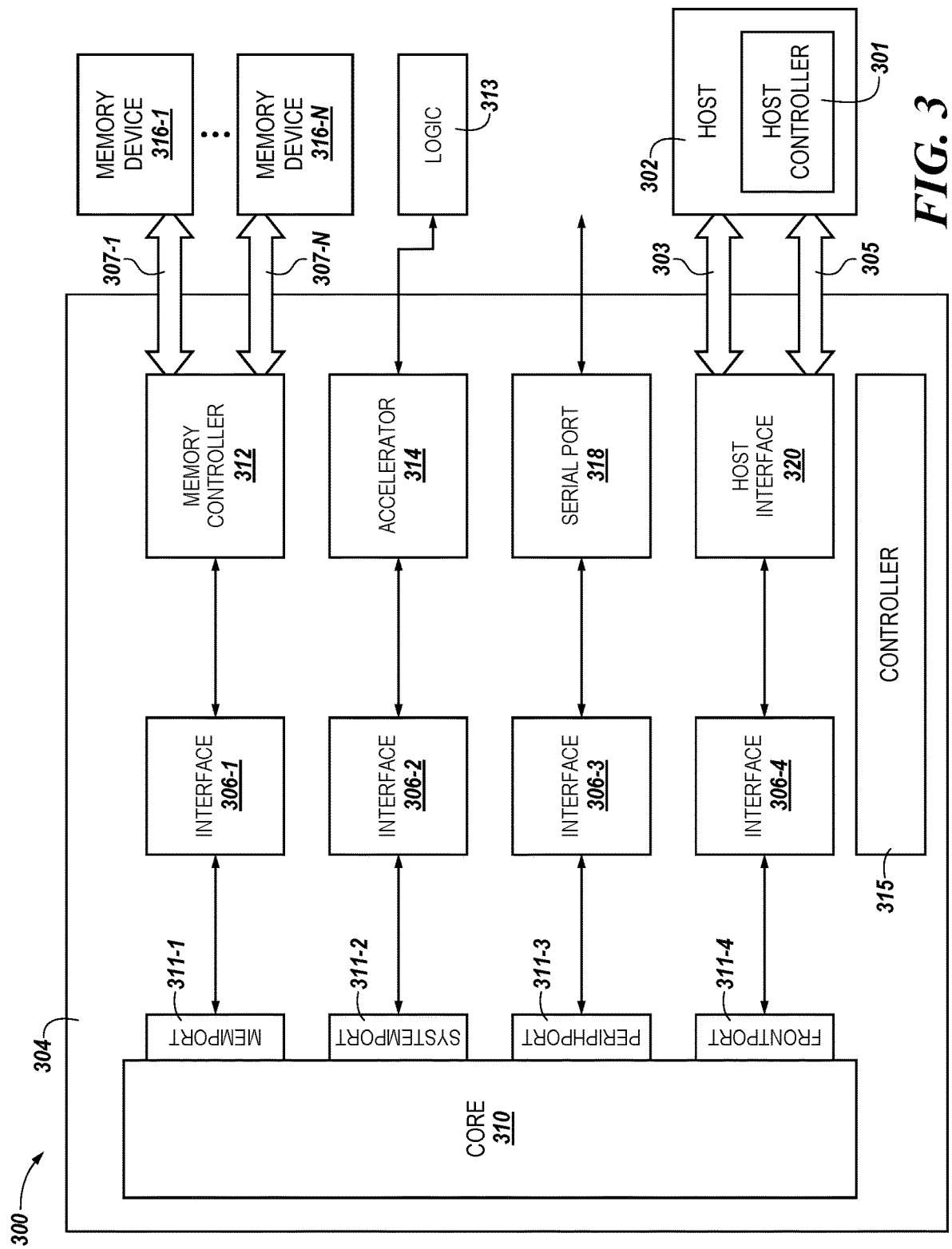
FIG. 3 is yet another functional block diagram in the form of a computing system including an apparatus including a computing core, a plurality of communication subsystems, and a plurality of memory devices in accordance with a number of embodiments of the present disclosure.

FIG. 3 is a functional block diagram in the form of a computing system 300 including an apparatus 304 including a plurality of communication subsystems 306 and a plurality of memory devices 316 in accordance with a number of embodiments of the present disclosure. As used herein, an "apparatus" can refer to, but is not limited to, any of a variety of structures or combinations of structures, such as a circuit or circuitry, a die or dice, a module or modules, a device or devices, or a system or systems, for example. In the embodiment illustrated in FIG. 3, memory devices 316-1 . . . 316-N can include one or more memory modules (e.g., double data rate (DDR) memory, three-dimensional (3D) cross-point memory, NAND memory, single in-line memory modules, dual in-line memory modules, etc.). The memory devices 316-1, . . . , 316-N can include volatile memory and/or non-volatile memory. In a number of embodiments, memory devices 316-1, . . . , 316-N can include a multi-chip device. A multi-chip device can include a number of different memory types and/or memory modules. For example, a memory system can include non-volatile or volatile memory on any type of a module.

As illustrated in FIG. 3, the apparatus 304 can include a computing device (e.g., computing core). In some embodiments, the apparatus 304 can be an FPGA. In contrast to FIGS. 1 and 2, each port of the computing device 310 can be directly coupled to the plurality of communication subsystems 306 (as an example, without being coupled via an additional set of communication subsystems, such as communication subsystems 108 and 208, which may be multiplexers). The computing device 310 can be coupled to the plurality of communication subsystems 306 via corresponding port connections including a memory port ("MemPort") 311-1, system port "SystemPort") 311-2, peripheral port ("PeriphPort") 311-3, and front port ("FrontPort") 311-4).

The memory port 311-1 can be directly coupled to a communication subsystem 306-1 specifically designated to receive data from a memory port and transfer the data to a memory controller 312. The system port 311-2 can be directly coupled to a communication subsystem 306-2 specifically designated to receive data from the system port 311-2 and transfer the data to an accelerator (e.g., an on-chip accelerator) 314, which can then transfer data to additional logic circuitry 313. The peripheral port 311-3 can be directly coupled to a communication subsystem 306-3 specifically designated to receive data from the peripheral port 311-3 and transfer the data to a serial port 318. The front port 311-4 can be directly coupled to a communication subsystem 306-4 specifically designated to receive data from the front port 311-4 and transfer the data to a host interface 320, and subsequently to a host 302 via channels 303 and/or 305. In this embodiment, a multiplexer may not be used between a port and a communication subsystem but rather directly connect the port and the communication subsystem for data transfer.

In some embodiments, the communication subsystems 306 can facilitate visibility between respective address spaces of the computing device 310. For example, the computing device 310 can, responsive to receipt of data and/or a file, store the data in a memory resource of the computing device 310. The computing device can associate an address (e.g., a physical address) corresponding to a location in the memory resource of the computing device 310 in which the data is stored. In addition, the computing device 310 can parse (e.g., break) the address associated with the data into logical blocks.

In some embodiments, the zeroth logical block associated with the data can be transferred to a processing device (e.g., a reduced instruction set computing (RISC) device). A particular computing device (e.g., computing device 110, 210, 310) can be configured to recognize that a particular set of logical addresses are accessible to that computing device (e.g., 210-2), while other computing devices (e.g., computing device 210-3, 210-4, respectively, etc.) can be configured to recognize that different sets of logical addresses are accessible to those computing devices 110, 210, 310. Stated alternatively, a first computing device (e.g., the computing device 210-2) can have access to a first set of logical addresses associated with that computing device (210-2), and a second computing device (e.g., the computing device 210-3) can have access to a second set of logical address associated therewith, etc.

If data corresponding to the second set of logical addresses (e.g., the logical addresses accessible by the second computing device 210-3) is requested at the first computing device (e.g., the computing device 210-2), the communication subsystems 306 can facilitate communication between the first computing device (e.g., the computing device 210-2) and the second computing device (e.g., the computing device 210-3) to allow the first computing device (e.g., the computing device 210-2) to access the data corresponding to the second set of logical addresses (e.g., the set of logical addresses accessible by the second computing device 210-3). That is, the communication subsystem 308 can facilitate communication between the computing device 310 (e.g., 210-1) and additional computing devices (e.g., computing devices 210-2, 210-3, 210-4) to allow address spaces of the computing devices to be visible to one another.

In some embodiments, communication between the computing devices 110, 210, 310 to facilitate address visibility can include receiving, by an event queue of the first computing device (e.g., the computing device 210-1), a message requesting access to the data corresponding to the second set of logical addresses, loading the requested data into a memory resource of the first computing device, and transferring the requested data to a message buffer. Once the data has been buffered by the message buffer, the data can be transferred to the second computing device (e.g., the computing device 210-2) via the communication subsystem 310.

For example, during performance of an extended memory operation, the controller 115, 215, 315 and/or a first computing device (e.g., the computing device 210-1) can determine that the address specified by a host command (e.g., a command to initiate performance of an extended memory operation generated by a host such as the host 102 illustrated in FIG. 1) corresponds to a location in a memory resource of a second computing device (e.g., the computing device 210-2) among the plurality of computing devices (110, 210). In this case, a computing device command can be generated and sent from the controller 115, 215, 315 and/or the first computing device (210-1) to the second computing device (210-2) to initiate performance of the extended memory operation using an operand stored in the memory resource of the second computing device (210-2) at the address specified by the computing device command.

In response to receipt of the computing device command, the second computing device (210-2) can perform the extended memory operation using the operand stored in the memory resource of the second computing device (210-2) at the address specified by the computing device command. This can reduce command traffic from between the host and the storage controller and/or the computing devices (210, 310), because the host need not generate additional commands to cause performance of the extended memory operation, which can increase overall performance of a computing system by, for example reducing a time associated with transfer of commands to and from the host.

In some embodiments, the controller 115, 215, 315 can determine that performing the extended memory operation can include performing multiple sub-operations. For example, an extended memory operation may be parsed or broken into two or more sub-operations that can be performed as part of performing the overall extended memory operation. In this case, the controller 115, 215, 315 and/or the communication subsystems (106, 108, 206, 208, 308) can utilize the above described address visibility to facilitate performance of the sub-operations by various computing devices 110, 210, 310. In response to completion of the sub-operation, the controller 115, 215, 315 can cause the results of the sub-operations to be coalesced into a single result that corresponds to a result of the extended memory operation.

In other embodiments, an application requesting data that is stored in the computing devices 110, 210, 310 can know (e.g., can be provided with information corresponding to) which computing devices 110, 210, 310 include the data requested. In this example, the application can request the data from the relevant computing device 110, 210, 310 and/or the address may be loaded into multiple computing devices 110, 210, 310 and accessed by the application requesting the data via the communication subsystems 108, 106, 208, 206, 308.

The controller 115, 215, 315 can be discrete circuitry that is physically separate from the communication subsystems 108, 106, 208, 206, 308 and can each be provided as one or more integrated circuits that allows communication between the computing devices 110, 210, 310, the memory controller 112, 212, 312 and/or the controller 115, 215, 315. Non-limiting examples of communication subsystems 108, 106, 208, 206, 308 can include a XBAR or other communications subsystem that allows for interconnection and/or interoperability of the controller 115, 215, 315, the computing devices 110, 210, 310, and/or the memory controller 112, 212, 312.

As described above, responsive to receipt of a command generated by the controller 115, 215, 315, the communication subsystems 108, 106, 208, 206, 308, and/or a host (e.g., the host 102 illustrated in FIG. 1), performance of extended memory operations using data stored in the computing devices 110, 210, 310 and/or from blocks of data streamed through the computing devices 110, 210, 310 can be realized.

FIG. 4 is a functional block diagram in the form of a computing core 410 including a number of ports 411-1, 411-2, 411-3, 411-4 in accordance with a number of embodiments of the present disclosure. The computing core 410 can include a memory management unit (MMU) 420, a physical memory protection (PMP) unit 422, and a cache 424.

The MMU 420 refers to a computer hardware component used for memory and caching operations associated with a processor. The MMU 420 can be responsible for memory management and be integrated into the processor, or, in some examples, can be on a separate integrated circuit (IC) chip. The MMU 420 can be used for hardware memory management which can include overseeing and regulating the processor's use of random access memory (RAM) and cache memory. The MMU 420 can be used for operating system (OS) memory management, which can ensure the availability of adequate memory resources for the objects and data structures of each running program. The MMU 420 can be used for application memory management, which can allocate each individual program's required or used memory, and then recycle freed up memory space when the operation concludes or the space becomes available.

In one embodiment, physical memory can be protected using the PMP unit 422 to restrict access to memory and isolate processes from each other. The PMP unit 422 can be used to set memory access privileges (read, write, execute) for specified memory regions. The PMP unit 422 can support 8 regions with a minimum region size of 4 bytes. In some examples, the PMP unit 422 may only be programmed in a privilege mode referred to as M-mode (or machine mode). The PMP unit 422 may enforce permissions on U-mode accesses. However, locked regions may additionally enforce their permissions on M-mode. The cache 424 can be an SRAM cache, a 3D cross-point cache, etc. The cache 424 can include 8 KB, 16 KB, 32 KB, etc. and can include error correction coding (ECC).

In one embodiment, the computing core 410 can also include a plurality of ports including a memory port 411-1, a system port 411-2, a peripheral port 411-3, and a front port 411-4. The memory port 411-1 can be directly coupled to a communication subsystem (as illustrated in FIG. 3) specifically designated to receive data from a memory port 411-1. The system port 411-2 can be directly coupled to a communication subsystem specifically designated to receive data from the system port 411-2. The data through the system port 411-2 can be transferred to an accelerator (e.g., an on-chip accelerator). The peripheral port 411-3 can be directly coupled to a communication subsystem specifically designated to receive data from the peripheral port 411-3 and this data can be eventually transferred to a serial port. The front port 411-4 can be directly coupled to a communication subsystem specifically designated to receive data from the front port 411-4 and this data can be eventually transferred to a host interface, and subsequently to a host.

The computing core 410 can be a full-Linux capable, cache-coherent 64-bit RISC-V processor. In some examples, the memory port 411-1, the system port 411-2, and the peripheral port 411-3 can be outgoing ports and the front port 411-4 can be an incoming port. An example of computing core 410 can include a U54-MC computing core. The computing core 410 can include an instruction memory system, an instruction fetch unit, an execution pipeline unit, a data memory system, and support for global, software, and timer interrupts. The instruction memory system can include a 16 Kilobyte (KiB) 2-way set-associative instruction cache. The access latency of all blocks in the instruction memory system can be one clock cycle. The instruction cache may not be kept coherent with the rest of the platform memory system. Writes to the instruction memory may be synchronized with the instruction fetch stream by executing a FENCE.I instructions. The instruction cache can have a line size of 64 byes, and a cache line fill can trigger a burst access outside the computing core 410.

The instruction fetch unit can include branch prediction hardware to improve performance of the processor core. The branch predictor can include a 28-entry branch target buffer (BTB), which can predict a target of taken branches, a 512-entry branch history table (BHT), which can predict the direction of conditional branches, and a 6-entry return-address stack (RAS) which can predict a target of procedure returns. The branch predictor may have one-cycle latency, so that correctly predicted control-flow instructions result in no penalty. Mispredicted control-flow instructions may incur three-cycle penalty.

The execution pipeline unit can be a single-issue, in-order pipeline. The pipeline can include five stages: instruction fetch, instruction decode and register fetch, execute, data memory access, and register writeback. The pipeline can have a peak execution rate of one instruction per clock cycle, and may be fully bypassed so that most instructions have a one-cycle result latency. The pipeline may interlock on read-after-write and write-after-write hazards, so instructions may be scheduled to avoid stalls.

In one embodiment, the data memory system can include a DTIM interface, which can support up to 8 KiB. The access latency from a core to its own DTIM may be two clock cycles for full words and three clock cycles for smaller quantities. Memory requests from one core to any other core's DTIM may not be as performant as memory requests from a core to its own DTIM. Misaligned accesses are not supported in hardware and may result in a trap to allow software emulation.

In some embodiments, the computing core 410 can include a floating-point unit (FPU) which can provide full hardware support for the IEEE 754-2008 floating-point standard for 32-bit single-precision and 64-bit double-precision arithmetic. The FPU can include a fully pipelined fused-multiply-add unit and an iterative divide and square-root unit, magnitude comparators, and float-to-integer conversion units, with full hardware support for subnormals and IEEE default values.

Figure 5:
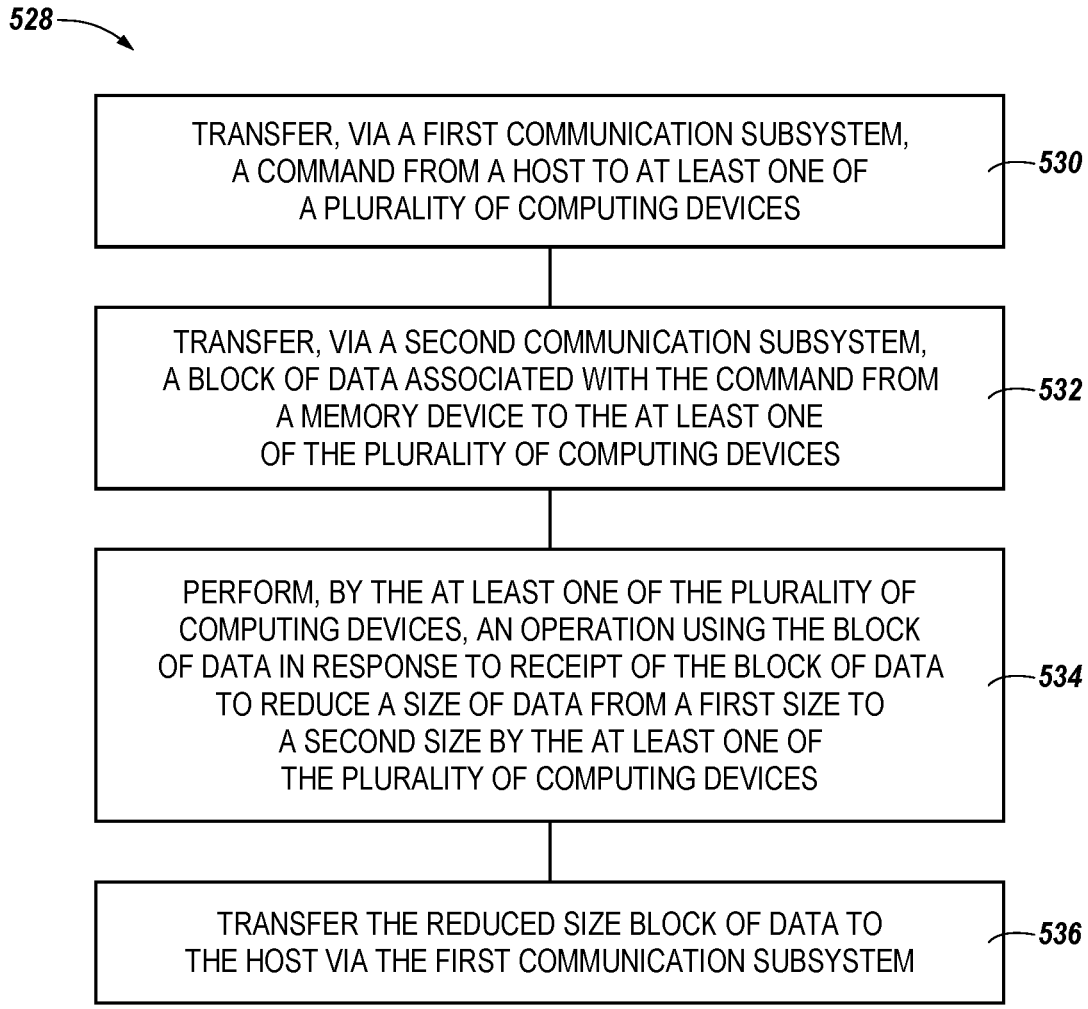
FIG. 5 is a flow diagram representing an example method corresponding to an extended memory architecture in accordance with a number of embodiments of the present disclosure.

FIG. 5 is a flow diagram representing an example method 528 corresponding to an extended memory architecture in accordance with a number of embodiments of the present disclosure. At block 530, the method 528 can include transferring, via a first communication subsystem and a second communication subsystem, a command from a host to at least one of a plurality of computing devices. The first communication subsystem can be coupled to the host and the second communication subsystem can be coupled to a computing device and to the memory device. The transferring of the command can be in response to receiving a request to transfer the block of data in order to perform an operation associated with the command. In some embodiments, receiving the command to initiate performance of the operation can include receiving an address corresponding to a memory location in the particular computing device in which the operand corresponding to performance of the operation is stored. For example, as described above, the address can be an address in a memory portion in which data to be used as an operand in performance of an operation is stored.

At block 532, the method 528 can include transferring, via second communication subsystem, a block of data associated with the command from a memory device to the at least one of the plurality of computing devices.

At block 534, the method 528 can include performing, by the at least one of the plurality of computing devices, an operation using the block of data in response to receipt of the block of data to reduce a size of data from a first size to a second size by the at least one of the plurality of computing devices. The performance of the operation can be caused by a controller. The controller can be analogous to the controller 115, 215, 315 illustrated in FIGS. 1-3, herein. In some embodiments, performing the operation can include performing an extended memory operation, as described herein. The operation can further include performing, by the particular computing device, the operation in the absence of receipt of a host command from a host coupleable to the controller. In response to completion of performance of the operation, the method 528 can include sending a notification to a host coupleable to the controller.

At block 536, the method 528 can include transferring the reduced size block of data to a host via the first communication subsystem. The method 528 can further include causing, using an additional controller (e.g., memory controller), the blocks of data to be transferred from the memory device to the second plurality of communication subsystems. The method 528 can further include allocating, via the first and the second pluralities of communication subsystems, resources corresponding to respective computing devices among the plurality of computing devices to perform the operation on the block of data.

In some embodiments, the command to initiate performance of the operation can include an address corresponding to a location in the memory array of the particular computing device and the method 528 can include storing a result of the operation in the address corresponding to the location in the particular computing device. For example, the method 528 can include storing a result of the operation in the address corresponding to the memory location in the particular computing device in which the operand corresponding to performance of the operation was stored prior to performance of the extended memory operation. That is, in some embodiments, a result of the operation can be stored in the same address location of the computing device in which the data that was used as an operand for the operation was stored prior to performance of the operation.

In some embodiments, the method 528 can include determining, by the controller, that the operand corresponding to performance of the operation is not stored by the particular computing device. In response to such a determination, the method 528 can further include determining, by the controller, that the operand corresponding to performance of the operation is stored in a memory device coupled to the plurality of computing devices. The method 528 can further include retrieving the operand corresponding to performance of the operation from the memory device, causing the operand corresponding to performance of the operation to be stored in at least one computing device among the plurality of computing device, and/or causing performance of the operation using the at least one computing device. The memory device can be analogous to the memory devices 116 illustrated in FIG. 1.

The method 528 can, in some embodiments, further include determining that at least one sub-operation is to be performed as part of the operation, sending a command to a computing device different than the particular computing device to cause performance of the sub-operation, and/or performing, using the computing device different than the particular computing device, the sub-operation as part of performance of the operation. For example, in some embodiments, a determination that the operation is to be broken into multiple sub-operations can be made and the controller can cause different computing devices to perform different sub-operations as part of performing the operation. In some embodiments, the controller can, in concert with the first and the second pluralities of communications subsystem, such 108, 106, 208, 206, and 308 illustrated in FIGS. 1-3, herein, assign sub-operations to two or more of the computing devices as part of performance of the operation.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
a plurality of computing devices that each comprise:
a processing unit configured to perform an operation on a block of data; and
a memory array configured as a cache for each respective processing unit;
a first communication subsystem coupled to a host and to each of the plurality of computing devices; and
a plurality of second communication subsystems coupled to each of the plurality of computing devices, wherein each of the plurality of second communication subsystems are coupled to at least one hardware accelerator;
wherein each of the plurality of computing devices are configured to:
receive a request from the host to perform an extended memory operation; and
perform at least a first portion of the extended memory operation within each respective computing device of the plurality of computing devices without transferring data associated with the first portion external to the respective computing device;
send, via one of the plurality of second communication subsystems, to the at least one hardware accelerator, a command to execute at least a second portion of the extended memory operation; and
receive a result of performing the at least second portion of the extended memory operation from the at least one hardware accelerator.

2. The apparatus of claim 1, wherein the plurality of second communication subsystems comprises a plurality of interconnect interfaces.

3. The apparatus of claim 1, wherein the first communication subsystem is a peripheral component interconnect express (PCIe) interface.

4. The apparatus of claim 1, wherein a particular one of the plurality of second communication subsystems is a controller and the controller is coupled to a memory device.

5. The apparatus of claim 4, wherein the memory device comprises at least one of a double data rate (DDR) memory, a three-dimensional (3D) cross-point memory, a NAND memory, or any combination thereof.

6. The apparatus of claim 1, wherein the accelerator is on-chip and is coupled to a static random access device (SRAM).

7. The apparatus of claim 1, wherein the accelerator is on-chip and is coupled to an arithmetic logic unit (ALU) configured to perform an arithmetic operation or a logical operation, or both.

8. The apparatus of claim 1, wherein the processing unit of each of the plurality of computing devices is configured with a reduced instruction set architecture.

9. The apparatus of claim 1, wherein the extended memory operation performed on the block of data comprises one of:
a floating point accumulate operation;
a 32-bit complex operation;
a square root address (SQRT) operation; and
a conversion operation to convert between floating-point and integer formats.

10. The apparatus of claim 1, wherein each of the plurality of computing devices is configured as reduced instruction set computer (RISC) compliant.

11. The apparatus of claim 1, wherein the at least one hardware accelerator is configured to perform the extended memory operation by accessing a non-volatile memory device coupled to the plurality of second communication subsystems.

12. The apparatus of claim 1, wherein the at least one hardware accelerator is configured to send a request for an additional hardware accelerator to perform an additional portion of the extended memory operation.

13. A system, comprising:
a plurality of computing devices that each comprise:
a processing unit configured to perform an operation on a block of data; and
a memory array configured as a cache for each respective processing unit;
a first communication subsystem coupled to a host and to each of the plurality of computing devices;
a plurality of second communication subsystems coupled to each of the plurality of computing devices, wherein each of the plurality of second communication subsystems are coupled to:
at least one hardware accelerator; and
at least one internal SRAM; and
a non-volatile memory device;
wherein each of the plurality of computing devices are configured to:
receive a request from the host to perform an extended memory operation; and
perform at least a first portion of the extended memory operation within each respective computing device of the plurality of computing devices and without transferring data associated with the at least first portion external to the respective computing device;
send, via one of the plurality of second communication subsystems, to the at least one hardware accelerator or the at least one internal SRAM, a command to execute at least a second portion of the extended memory operation; and
receive a result of performing the at least second portion of the extended memory operation from the at least one hardware accelerator or the at least one internal SRAM.

14. The system of claim 13, wherein the plurality of computing devices, the first communication subsystem, and the second plurality of communication subsystems are configured on a field programmable gate array (FPGA) and the non-volatile memory device is external to the FPGA.

15. The system of claim 13, wherein the plurality of computing devices are each configured as a reduced instruction set computer (RISC)-V compliant.

16. The system of claim 13, wherein each of the plurality of computing devices comprises:
a memory port;
a system port;
a peripheral port; and
a front port.

17. The system of claim 16, wherein:
the memory port is coupled to the non-volatile memory device through the first communication subsystem and through at least one of the second plurality of communication subsystems; and
the system port is coupled to an on-chip accelerator through at least one of the first communication subsystem and through at least one of the second plurality of communication subsystems.

18. The system of claim 17, wherein the peripheral port is coupled to an off-chip serial port through the first communication subsystem and through at least one of the second plurality of communication subsystems.

19. The system of claim 13, wherein the first communication subsystem is directly coupled to at least one of the second plurality of communication subsystems.

20. The system of claim 19, wherein the at least one of the second plurality of communication subsystem is configured to transfer the block of data from the non-volatile memory device to the first communication subsystem and to the host, wherein the transfer of the block of data bypasses the plurality of computing devices.

21. The system of claim 19, wherein an AXI interconnect that directly couples the first communication subsystem to at least one of the second plurality of communication subsystem is a faster AXI interconnect than an AXI interconnect that couples the plurality of computing devices to the first communication subsystem and to the at least one of the second plurality of communication subsystems.

22. A method, comprising:
transferring, via a first communication subsystem, a command from a host to at least one of a plurality of computing devices;
transferring, via a second communication subsystem, a block of data associated with the command from a memory device to the at least one computing device of the plurality, wherein:
the first communication subsystem is coupled to the host and to the at least one computing device of the plurality; and
the second communication subsystem is coupled to the at least one computing device of the plurality and to the memory device;
performing, by the at least one computing device, an extended memory operation using the block of data in response to receipt of the command and the block of data to reduce a size of data from a first size to a second size by the at least one computing device;
wherein:
the extended memory operation is performed without transferring the block of data external to the at least one computing device; and
the at least one computing device is a reduced instruction set computing (RISC) device; and
transferring the reduced size block of data to the host via the first communication subsystem.

23. The method of claim 22, wherein the reduced size block of data is transferred to the host via a PCIe interface coupled to the first communication subsystem.

24. The method of claim 22, further comprising causing, using a memory controller, the block of data to be transferred from the memory device to the second communication subsystem and subsequently to the first communication subsystem, wherein the block of data bypasses the plurality of computing devices.

25. The method of claim 24, further comprising performing, via the memory controller, at least one of:
  a read operation associated with the memory device;
  a copy operation associated with the memory device;
  an error correction operation associated with the memory device; or
  a combination thereof.

26. The method of claim 22, further comprising causing, using a memory controller, the reduced size block of data to be transferred to the memory device;
  wherein a particular set of logical addresses associated with the memory device correspond to the at least one computing device and does not correspond to at least one other computing device of the plurality of computing devices.

* * * * *